United States Patent
Ku et al.

(10) Patent No.: US 8,129,958 B2
(45) Date of Patent: Mar. 6, 2012

(54) TRANSITION MODE POWER FACTOR CORRECTION DEVICE WITH BUILT-IN AUTOMATIC TOTAL HARMONIC DISTORTION REDUCTION FEATURE

(75) Inventors: Matthew Man Ho Ku, Irvine, CA (US); Run Qin Tan, Shenzhen (CN)

(73) Assignee: Evergreen Micro Devices Co., Ltd., Shenzhen (CN)

( * ) Notice: Subject to any disclaimer, the term of this patent is extended or adjusted under 35 U.S.C. 154(b) by 428 days.

(21) Appl. No.: 12/411,027

(22) Filed: Mar. 25, 2009

(65) Prior Publication Data

US 2010/0246226 A1    Sep. 30, 2010

(51) Int. Cl.
    *G05F 5/00*        (2006.01)
(52) U.S. Cl. ........................................ 323/207; 323/222
(58) Field of Classification Search .................. 323/207, 323/222, 283

See application file for complete search history.

(56) References Cited

U.S. PATENT DOCUMENTS

| | | | | |
|---|---|---|---|---|
| 5,568,041 A | * | 10/1996 | Hesterman | 323/207 |
| 6,104,172 A | * | 8/2000 | Josephs et al. | 323/222 |
| 7,180,273 B2 | * | 2/2007 | Bocchiola et al. | 323/207 |

* cited by examiner

*Primary Examiner* — Shawn Riley
(74) *Attorney, Agent, or Firm* — Morris Manning & Martin LLP; Tim Tingkang Xia, Esq.

(57) ABSTRACT

A controller for reducing the harmonics contents in the AC-to-DC converter that is capable of minimizing THD due to crossover distortion. The controller can approximate the shape of the current running through boost inductor to the sinusoidal waveform of the rectified line input voltage and in the meantime to keep the valley of rectified sinusoidal waveform line voltage close to local ground value. The controller can be used in a transition mode power factor correction device suitable for a wide range of AC line input voltage and output loading application.

11 Claims, 8 Drawing Sheets

Fig. 7b

TRANSITION MODE POWER FACTOR CORRECTION DEVICE WITH BUILT-IN AUTOMATIC TOTAL HARMONIC DISTORTION REDUCTION FEATURE

REFERENCE TO RELATED PATENT DOCUMENT

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

FIELD OF THE INVENTION

The present invention relates to a power factor correction device; and, more specific, to an improved transition mode power factor correction device for achieving lower average total harmonics contents of the current with respect to different line input voltages, capacitance of parasitic capacitor at Power switch NMOS drain node and output loads by means of feedback control.

BACKGROUND OF THE INVENTION

The increasing demand of Active Power Factor Devices (APFD) is driven by the concern for the quality of the power line supplies. Injection of high harmonics into the power line is well-known to cause many problems. Among these are the lower efficiency of power transmission, possible interference to other units connected to the power line, and distortion of the line voltage shape that is undesirable. In addition to resolve these issues, APFD offers another advantage to increase the power level that can be drawn from the power line.

One of the main contributors of Total Harmonic Distortion (THD) in Active Power Factor Correction System (APFCS) is the so-called "Crossover Distortion". The root cause of the Crossover Distortion is due to the residual voltage across the capacitor 1C1 after the bridge rectifier (refer to FIG. 1). This residual voltage blocks the current flow from bridge rectifier as long as the absolute AC line voltage lower than the residual voltage plus the bridge diode 1BD1 on-forward threshold voltage. During this blocking period, APFCS is equivalent to non power factor correction system. The magnitude of the residual voltage is depend on the capacitance of the total parasitic capacitor at power switch 1NMOS drain node 106 (refer to FIG. 1), inductance of the boost inductor 121, AC line voltage and output loading 1RL (refer to the U.S. Pat. No. 6,946,819).

Figure 1:
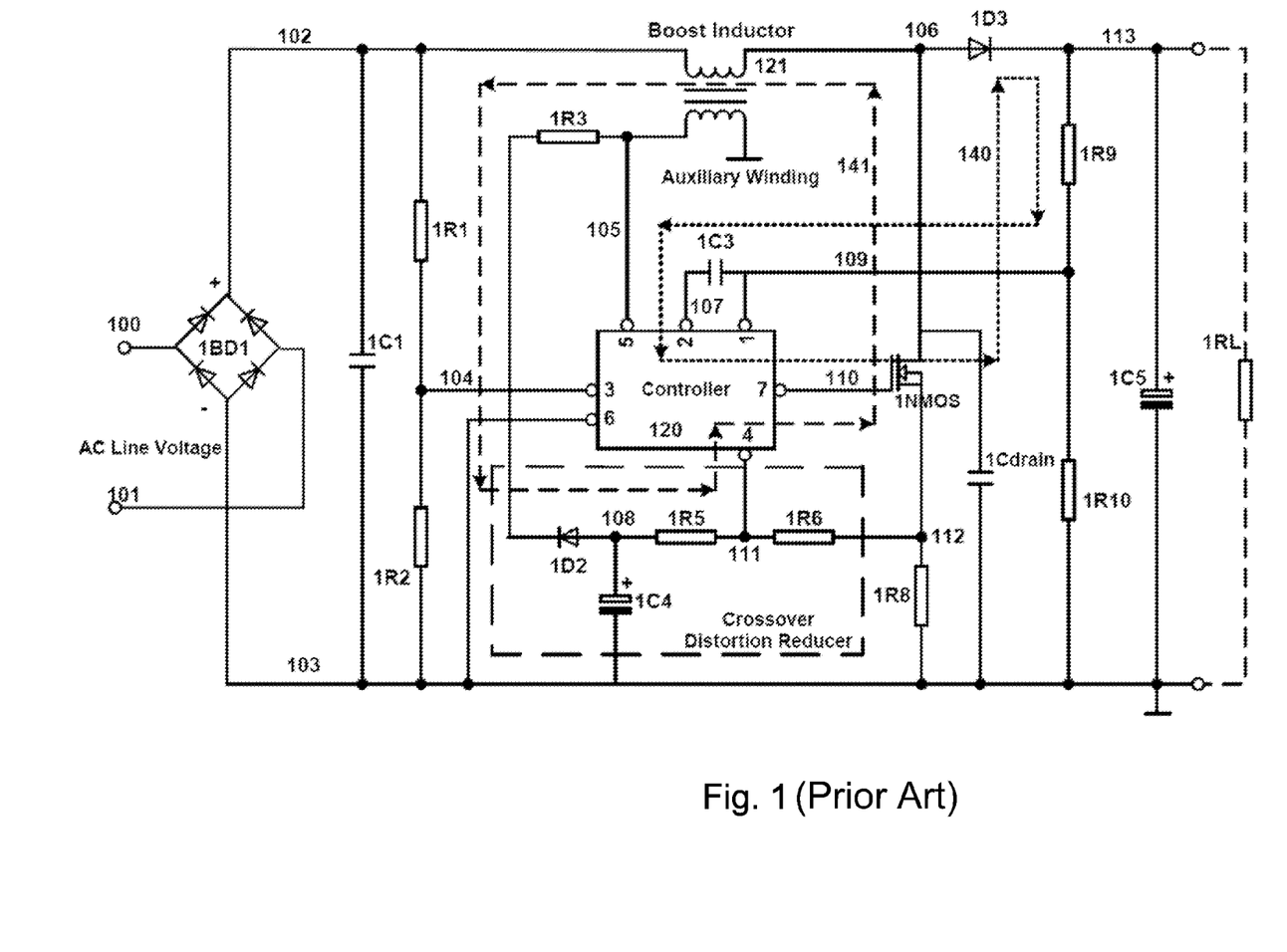
FIG. 1 is a schematic of a Power Factor Correction (PFC) in transition mode for a prior-art switching mode power supply with a Crossover Distortion Reducer.

FIG. 1 shows the prior art of the Active Power Factor Correction system for minimizing the Crossover Distortion (refer to the U.S. Pat. No. 6,946,819). Controller 120 receives feedback signals through the various lines 104, 111, 109, 105. Signal 104 is a rectified line voltage derived from a potential divider comprised of resistors 1R1 and 1R2, and whose shape is used as the Reference for the desired shape of the input current. Signal 111 is the sum of boost inductor current sense signal 112 and 108 from Crossover Distortion Reducer (CDR). The signal 112 serves to sense current flow through boost inductor 121 by sensing the voltage drop across the resistor R8. Negative voltage at node 108 generated from CDR which comprises Diode 1D2 and capacitor 1C4 is proportional to the rectified main voltage and the turn ratio of the auxiliary winding of the boost inductor 121. 109 represents a divided down boosted output signal at node 113 from the potential divider consisting of the resistors 1R9 and 1R10. Signal 105 obtained with an auxiliary winding on the boost inductor 121 serves to monitor the zero voltage crossing the boost inductor 121. Controller 120 is then based on these feedback signals to generate output signal at node 110 which define the on-off period of the power switch 1NMOS. Capacitor 1Cdrain is the equivalent parasitic capacitor connected between the node 106 and ground.

Figure 2:
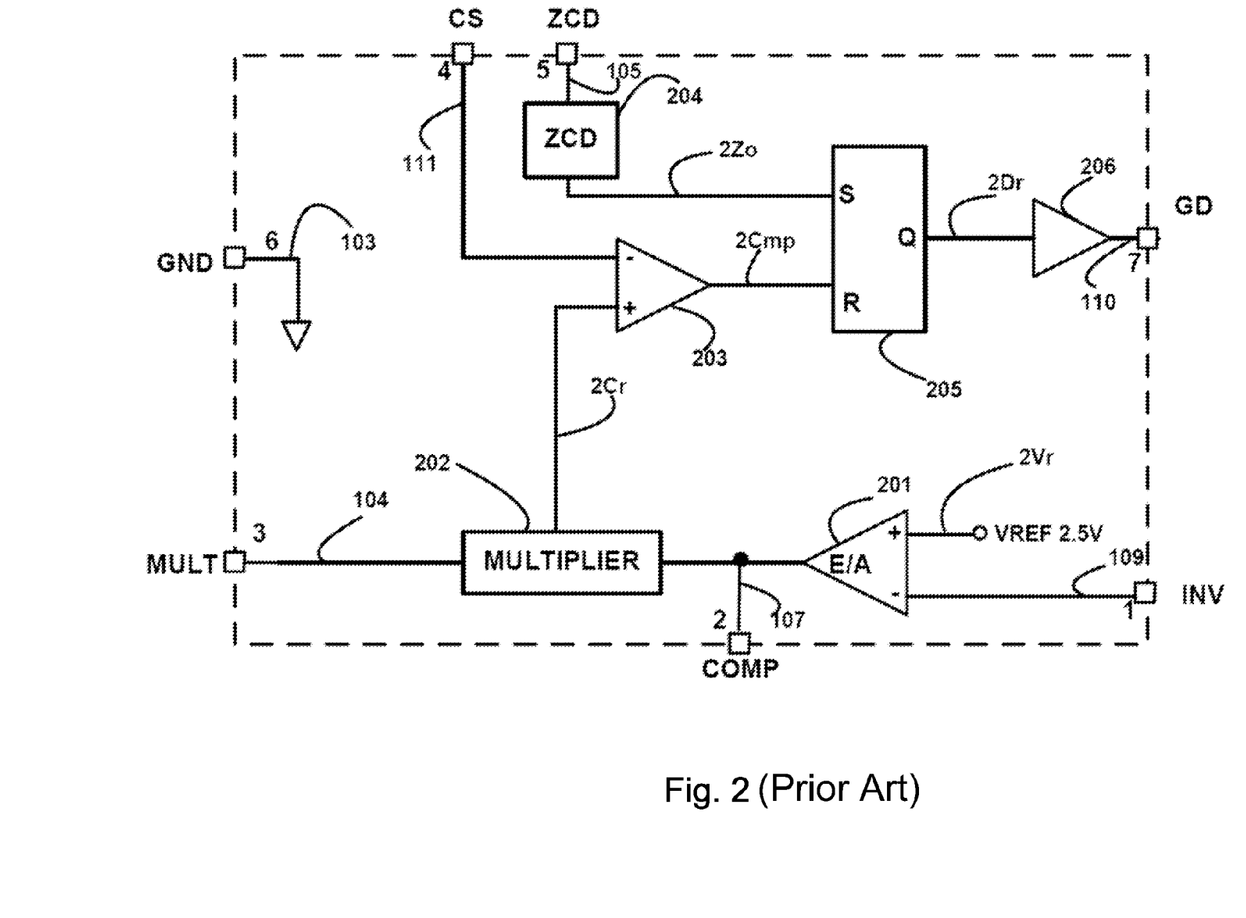
FIG. 2 shows the functional block diagram of a prior art PFC controller.

A detail block diagram of Controller 120 (FIG. 1) which is designed to maintain the output voltage at node 113 (FIG. 2) constant by feedback control is shown in FIG. 2. It is consist of an Error Amplifier 201 (FIG. 2), Multiplier 202 (FIG. 2), Comparator 203 (FIG. 2), Zero Crossing Detector (ZCD) 204 (FIG. 2), RS Flip-Flop Register 205 (FIG. 2) and Gate Driver 206 (FIG. 2). The Error Amplifier receives signal from node 109 or Pin 1 (FIG. 2) which is compared with internal set reference voltage, for example 2.5V, to generate an error signal at node 107 or Pin 2 (FIG. 2). The Multiplier 202 serves to multiply the error signal with the divided-down rectified signal at node 104 or Pin 3 (FIG. 2) and to produce a rectified sinusoidal reference signal 2Cr. Comparator 203 (FIG. 2) compares the rectified sinusoidal reference signal 2Cr with signal at node 111 or Pin 4 (FIG. 2) from the CDR to create a logic signal for power switch 1NMOS off control. Signal from node 105 or Pin 5 (FIG. 2) is monitored by Zero Crossing Detector 204 (FIG. 2). At the time when a positive to negative voltage event or so-called "zero crossing" occurs, a logic high signal is generated from Zero Crossing Detector 204 (FIG. 2) to set RS Flip-Flop Register 205 (FIG. 2) that turns to switch on power switch 1NMOS. The boost inductor current and its sense signal voltage at node 111 or Pin 4 (FIG. 2) starts to rise at the time of the power switch 1NMOS on. When the sense signal voltage rises up to equal to the rectified sinusoidal reference signal 2Cr, a reset signal is produced from Comparator 203 (FIG. 2) to reset the RS Flip-Flop Register 205 (FIG. 2) that turns to switch off the power switch 1NMOS. The power switch 1NMOS stays off until next "zero crossing" event and the switch on-off cycle starts over again.

The main concept behind this prior art implementation is to fully discharge capacitor 1C1 at zero crossing of AC line voltage. This can be done by artificially increasing the on-time of the power switch 1NMOS with a negative offset on the current sense input pin 4 of controller 120 at node 111. The negative offset voltage is introduced by CDR and its operation principle is described below:

During the on-time period of power switch 1NMOS, voltage across the auxiliary coil 120 is negative that forward bias diode 1D2 to charge the capacitor 1C4. A negative voltage which is proportional to RMS value of line voltage and the turn ratio of the auxiliary coil 121 is maintained by capacitor 1C4. This negative voltage turns to extend the power switch 1NMOS switching on-time through a potential divider consisting of 1R6 and 1R5, which generates a control signal at node 111, and presents to controller 120 pin 4.

A major drawback of the prior art design is the need of manual adjustment on the resistance value of 1R6 to find the optimum solution. The required offset voltage generated from CDR for THD optimization is output load, AC line voltage and parasitic capacitor capacitance at node 106 dependence. In other words, this design is only good for certain range of loading and equivalent drain capacitance 1Cdrain at node 106.

SUMMARY OF THE INVENTION

In one aspect, the present invention is directed to a total harmonic distortion (THD) reducer for setting an appropriate offset voltage to force the valley of a scale-down rectified sinusoidal line voltage close to a reference value through a feedback control.

In one embodiment, the THD reducer includes two comparators, an up-down counter and a digital to analog converter (DAC). A first comparator is used to extract a rectified alternating current (AC) line frequency to produce a clock signal for the up-down counter. A second comparator is used to detect a zero crossing of the scale-down rectified sinusoidal line voltage relative to the reference value. The up-down counter is used to record a number of differences between non-zero crossing and zero crossing events with running time elapse. The DAC is used to convert the numerical digital value from the up-down counter to an analog direct current (DC) voltage.

In another embodiment, when a signal coupled to non-inverting input of the first comparator descends down to a clock reference signal coupled to inverting input of the first comparator, a falling edge clock signal is produced from the first comparator. Alternatively, when a signal coupled to non-inverting input of the first comparator rises up to a clock reference signal coupled to inverting input of the first comparator, a raising edge clock signal is produced from the first comparator.

In another aspect, the present invention is directed to a controller used in a transition mode power factor correction device and suitable for achieving an automatic THD optimization.

In one embodiment, the controller includes a THD reducer as described in the above embodiments, an error amplifier, a multiplier, a comparator, a zero crossing detector, a RS flip-flop register and a gate driver. The THD reducer is used for setting an appropriate offset voltage to force the valley of the scale-down rectified sinusoidal line voltage close to a reference value through the feedback control. The error amplifier is used for generating an output voltage error signal corresponding to a deviation between a scale-down output voltage from the output voltage divider and a predetermined reference voltage. The multiplier is used for combining the scale-down rectified sinusoidal line voltage with the output voltage error signal to generate a sinusoidal reference signal. The comparator is used for generating a logic signal for setting the power switch on period by comparing a received current sense signal with the sinusoidal reference signal. The zero crossing detector is used for generating an edge logic signal to turn on the power switch. The RS flip-flop register and gate driver is combined to create a required analog waveform pattern for driving the power switch and thereby approximating the shape of the current running through the boost inductor to the sinusoidal waveform of the rectified sinusoidal line voltage and in the meantime to keep the valley of the scale-down rectified sinusoidal line voltage close to a reference value.

In yet another aspect, the present invention is directed to a transition mode power factor correction device with built-in automatic THD reduction feature and suitable for a wide range of AC line input voltage and output loading application.

In one embodiment, the transition mode power factor correction device includes a converter and a controller coupled to the converter to obtain an input voltage. The controller in this embodiment is the same as the controller described in the above embodiments, and has a THD reducer capable of achieving an automatic THD optimization.

The converter includes a bridge rectifier, a rectified main voltage divider, a capacitor, a power switch, a boost inductor with auxiliary winding, and an outputting circuit. The bridge rectifier is connected to an AC line voltage to have a rectified sinusoidal line voltage. The rectified main voltage divider is connected to the bridge rectifier to scale down the rectified sinusoidal line voltage such that a scale-down rectified sinusoidal line voltage can be used by the controller. The capacitor is connected with the rectified main voltage divider in series to filter high frequency components of the rectified sinusoidal line voltage. The power switch, the boost inductor, the rectified main voltage divider and the controller form a THD optimization feedback loop. The power switch, the outputting circuit and the controller form a feedback control loop to maintain an output voltage level. An anode of the output diode is connected to a drain of the power switch, a cathode of the output diode is connected to the output voltage divider and the constant output voltage level is output at the cathode of the output diode.

In a further aspect, the present invention is directed to a transition mode power factor correction device with built-in automatic THD reduction feature.

In one embodiment, the transition mode power factor correction device includes a bridge rectifier, a rectified main voltage divider consisting of a first resistor and a second resistor, a boost inductor with auxiliary winding, a controller with auto THD optimization function, a power switch, an inductor current sense resistor, an output diode, and an output voltage divider consisting of a third resistor and a fourth resistor.

Two input ends of the bridge rectifier are connected with an AC line voltage. One output end of the bridge rectifier is grounded, and the other output end of the bridge rectifier is connected with a first end of the boost inductor. The rectified main voltage divider is connected to the two output ends of the bridge rectifier, and a scale-down rectified sinusoidal line voltage is provided to the controller. A second end of the boost inductor is connected to a drain of the power switch. A first end of the auxiliary winding is connected to the controller, and the second end of the auxiliary winding is grounded. The source of the power switch is connected with the controller and grounded through the inductor current sense resistor, and the gate of the power switch is connected to the controller. An anode of the output diode is connected to the drain of the power switch, and a cathode of the output diode is connected to the output diode.

The controller in this embodiment is the same as the controller in the above disclosed embodiments. A feedback control loop to maintain an output voltage level is formed by the power switch, the output diode, the output voltage divider and the controller through the error amplifier, the multiplier, the comparator, the zero crossing detector, the RS flip-flop register and gate driver.

These and other aspects of the present invention will become apparent from the following description of the preferred embodiment taken in conjunction with the following drawings, although variations and modifications therein may be effected without departing from the spirit and scope of the novel concepts of the disclosure.

a Comparator for generating a logic signal for setting the Power Switch on period by comparing a received current sense signal with the sinusoidal reference signal;

a Zero Crossing Detector for generating an edge logic signal to turn on the Power Switch;

a RS Flip-Flop Register and a Gate Driver combined to create a required analog waveform pattern for driving the Power Switch and thereby approximating the shape of the current running through the boost inductor to the sinusoidal waveform of the rectified sinusoidal line voltage and in the meantime to keep the valley of the scale-down rectified sinusoidal line voltage close to a reference value.

Advantagely, the feedback control loop to maintain an output voltage level is formed by said Power Switch, Output Diode, Output Voltage Divider and Controller through said Error Amplifier, Multiplier, Comparator, Zero Crossing Detector, RS Flip-Flop Register, and Gate Driver.

Advantagely, said THD reducer comprise: two comparators, an Up-down Counter and a Digital to Analog Converter, wherein, the first Comparator is used to extract a rectified AC line frequency to produce a clock signal for the Up-down Counter;

the second Comparator is used to detect the zero crossing of the scale-down rectified sinusoidal line voltage relative to the reference value, the Up-down Counter is used to record a number of difference between non-zero crossing and zero crossing events with running time elapse;

the DAC is used to convert the numerical digital value from the Up-down counter to an analog DC voltage.

Advantagely, a THD optimization feedback loop is formed by said Power Switch, Boost Inductor, Rectified Main Voltage Divider and Controller through said THD reducer, comparator, Zero Crossing Detector, RS Flip-Flop Register, and Gate Driver.

BRIEF DESCRIPTION OF THE DRAWINGS

So as to further explain the invention, an exemplary embodiment of the present invention will be described with reference to the below drawings, wherein.

DETAILED DESCRIPTION OF THE PREFERRED EMBODIMENT

These and other advantage, aspect and novel features of the present invention, as well as details of an illustrated embodiment thereof, will be more fully understand from the following description and drawings. While various embodiments of the present invention has been presented by way of example only, and not limitation.

A device equipped with Auto THD optimization function for the correction of the power factor in AC-DC power converter is proposed. It is an innovative solution for resolving Crossover Distortion problem in Active Power Factor Correction AC-DC Converter System (APFCS) without the need of manual adjustment on CDR resistor value R6 (FIG. 1) for THD optimization like the prior art described in the FIG. 1.

The built-in Auto THD optimization function enable the system automatically searching for optimum offset voltage for THD optimization in spite of the AC line voltage, output loading and parasitic capacitor capacitance at node 106 or 306. The operation principle of the device and system is described as following.

Figure 3:
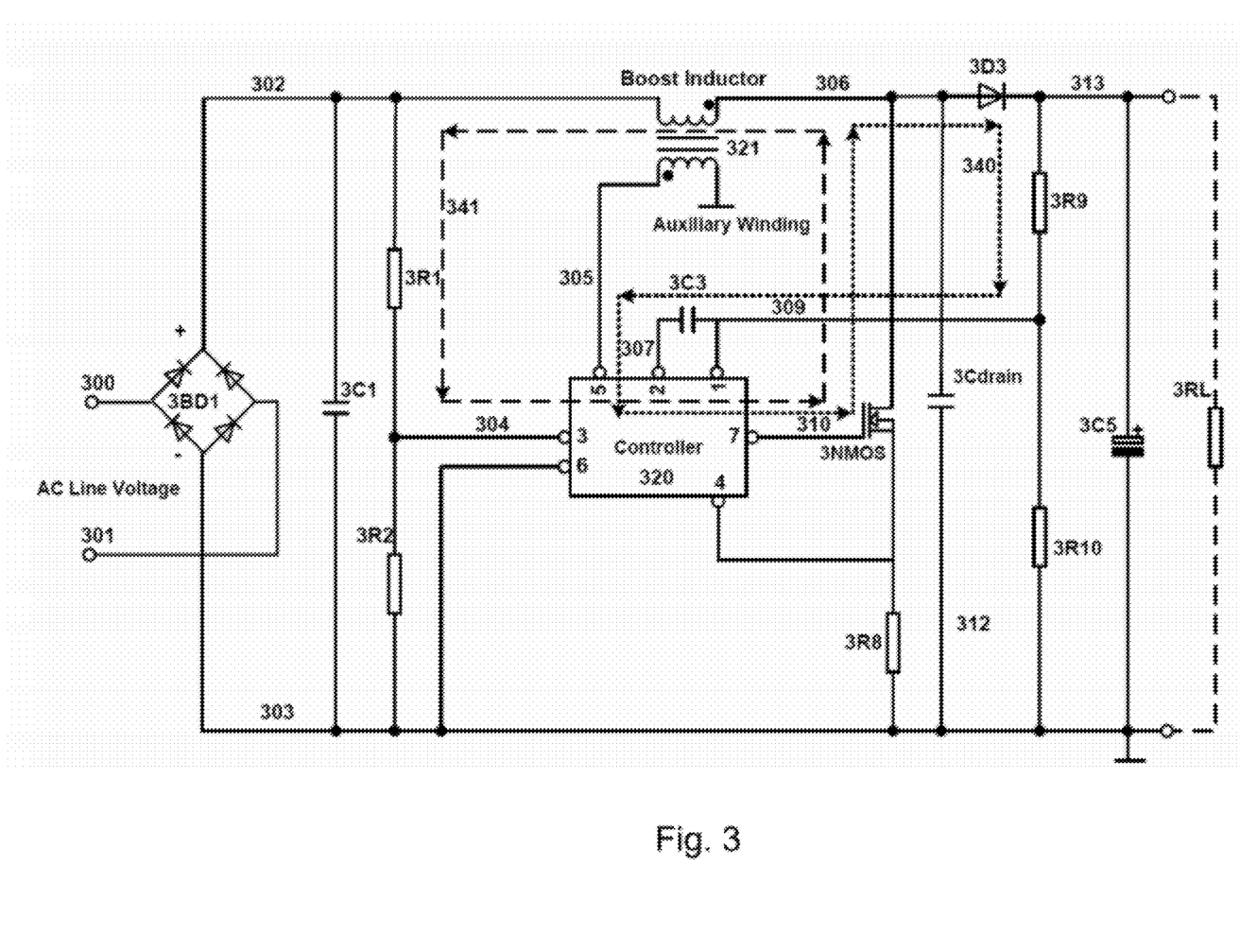
FIG. 3 is a schematic of a PFC in transition mode for a switching mode power supply with a built-in auto THD optimization function in PFC controller according to the present invention.
Figure 4:
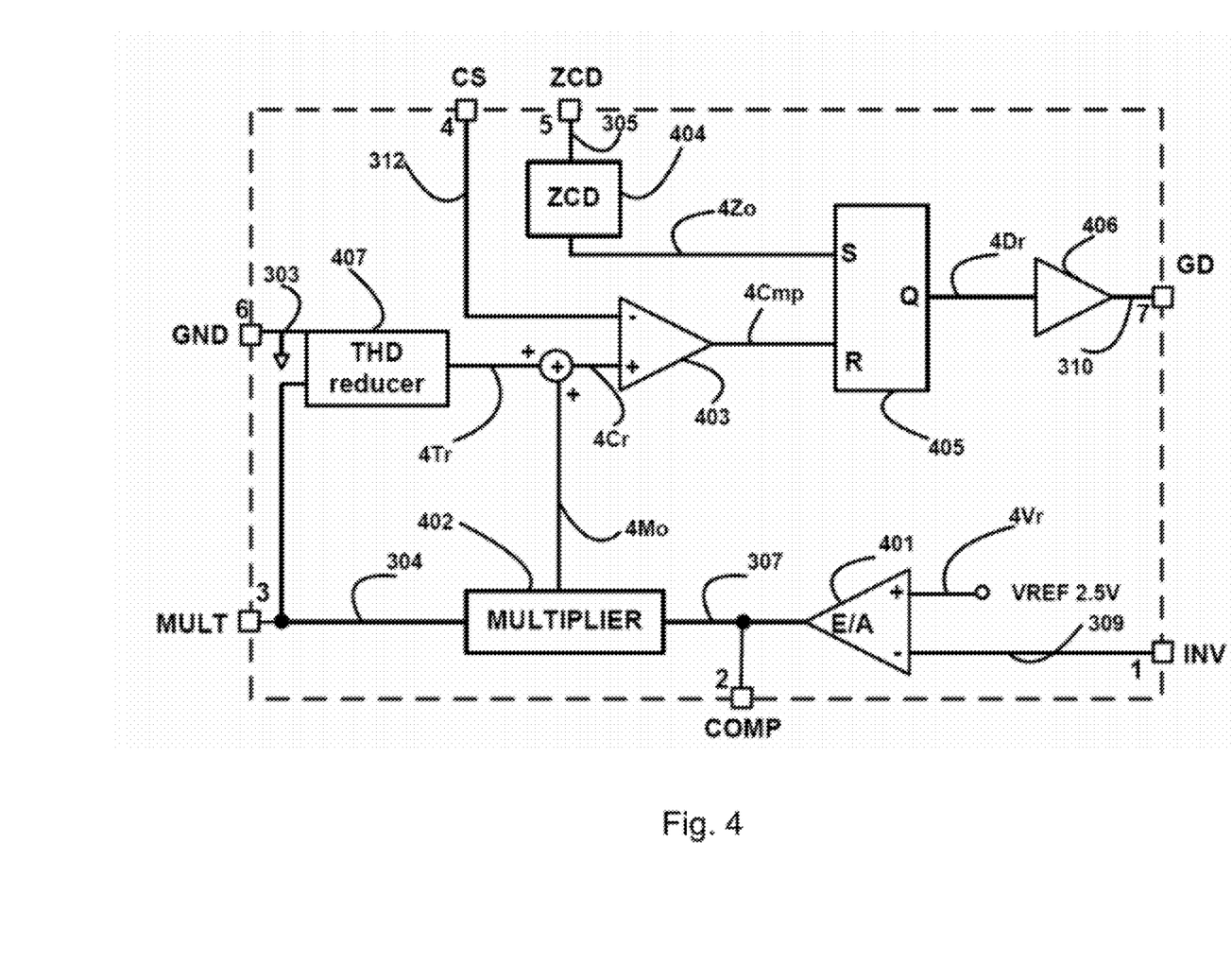
FIG. 4 shows the functional block diagram of the present invention PFC controller with a built-in THD Reducer.

FIG. 3 illustrates the system solution for APFCS implemented with device 320 of present invention. Its functional block diagram is shown in FIG. 4. This system consists of Bridge Rectifier 3BD1, Filter Capacitor 3C1, Rectified Main Voltage Divider consisting of 3R1 and 3R2, Boost Inductor with Auxiliary Winding 321, Controller 320, Power Switch 3NMOS, Inductor Current Sense Resistor 3R8, Output Diode 3D3, Output Capacitor 3C5, Output Voltage Divider consisting 3R9 and 3R10. Capacitor 3Cdrain is the equivalent parasitic capacitor connected between the node 306 and ground. As the auto THD optimization is a built-in function in device 320, Crossover Distortion Reducer circuit shown in FIG. 1 is no longer required in this APFCS.

Referring to FIG. 3, the AC line voltage is rectified by the Bridge Rectifier 3BD1 to have a rectified sinusoidal line voltage at node 302. Capacitor 3C1 is used to filter the high frequency components of the rectified sinusoidal line voltage and Rectified Main Voltage Divider consisting of 3R1 and 3R2 is to scale down rectified line voltage such that the scale-down voltage can be used by Controller 320 at pin 3. The Power Switch 3NMOS and Boost Inductor with Auxiliary Winding 321 form a high frequency boost converter. Energy stored in the Boost Inductor when Power Switch 3NMOS is on and energy released from the Inductor transferring to the Output Capacitor 3C5 and the load 3RL when Power Switch 3NMOS is off. The bulk Output Capacitor 3C5 is used to filter out the high frequency contents of switching ripple voltage and store the DC output voltage.

Constant DC output voltage level at node 313 is maintained by DC output feedback control 340 loop formed by Power Switch 3NMOS, Output Diode 3D3, Output Voltage Divider consisting of 3R9 and 3R10 (FIG. 3), and Controller 320 through an Error Amplifier 401 (FIG. 4), Multiplier 402 (FIG. 4), Comparator 403 (FIG. 4), Zero Crossing Detector (ZCD) 404 (FIG. 4), RS Flip-Flop Register 405 (FIG. 4), and Gate Driver 406 (FIG. 4).

It's operation principle is described as following:

The Error Amplifier receives signal from node 309 (FIG. 3) or Pin 1 (FIG. 4) which is compared with internal set reference voltage, for example 2.5V, to generate an error signal at node 307 (FIG. 3) or Pin 2 (FIG. 4). The Multiplier serves to multiply the error signal with the divided-down rectified signal at node 304 or Pin 3 (FIG. 4) and to produce a sinusoidal signal 4Mo (FIG. 4) which is proportional to RMS value of line voltage and the error signal at Pin 2 (FIG. 4). Summation of signal 4Mo (FIG. 4) and 4Tr (FIG. 4) generated from THD reducer 407 (FIG. 4) produces a sinusoidal current reference signal for Comparator 403 (FIG. 4) which compares with a signal from node 311 or Pin 4 (FIG. 4) to create a logic signal for power switch 3NMOS on-off control. Signal from node 305 or Pin 5 (FIG. 4) is monitored by Zero Crossing Detector. At the time when a positive to negative voltage event or so-called "zero crossing" is detected at Pin 5 (FIG. 4), a logic high signal is generated from Zero Crossing Detector to set RS Flip-Flop Register 405 (FIG. 4) that turns to switch on power switch 3NMOS. The boost inductor current and its sense signal at node 311 or Pin 4 (FIG. 4) start to rise at the time of the power switch 3NMOS on. When the sense signal rises up to Cr, a reset signal is produced from Comparator 403

(FIG. 4) to reset the RS Flip Flop register 405 (FIG. 4) that turns to switch off power switch 3NMOS. The power switch 3NMOS stays off until next "zero crossing" event and the switch on-off cycle starts again. At steady state, the DC level of error signal at node 307 (FIG. 3) or Pin 2 (FIG. 4) and the on-off switching period of Gate driver output is set to a certain value and pattern respectively according to AC Line Voltage and output loading 3RL such that a predefined constant output voltage across 3RL is maintained.

THD optimization can be achieved by adding an appropriate offset signal any where around the DC output feedback control loop 340 such that the residual voltage across 3C1 (FIG. 3) is reduced close to zero when AC line voltage is near zero voltage point.

A method that can automatically search for the optimum offset voltage for THD optimization is described in this paragraph:

Another THD optimization feedback loop 341 is formed by Power Switch 3NMOS and Boost Inductor with Auxiliary Winding 321, Rectified Main Voltage Divider consisting of 3R1 and 3R2 and Controller 320 through THD Reducer 407 (FIG. 4), Comparator 403 (FIG. 4), Zero Crossing Detector (ZCD) 404 (FIG. 4), RS Flip-Flop Register 405 (FIG. 4), and Gate Driver 406 (FIG. 4).

Figure 5:
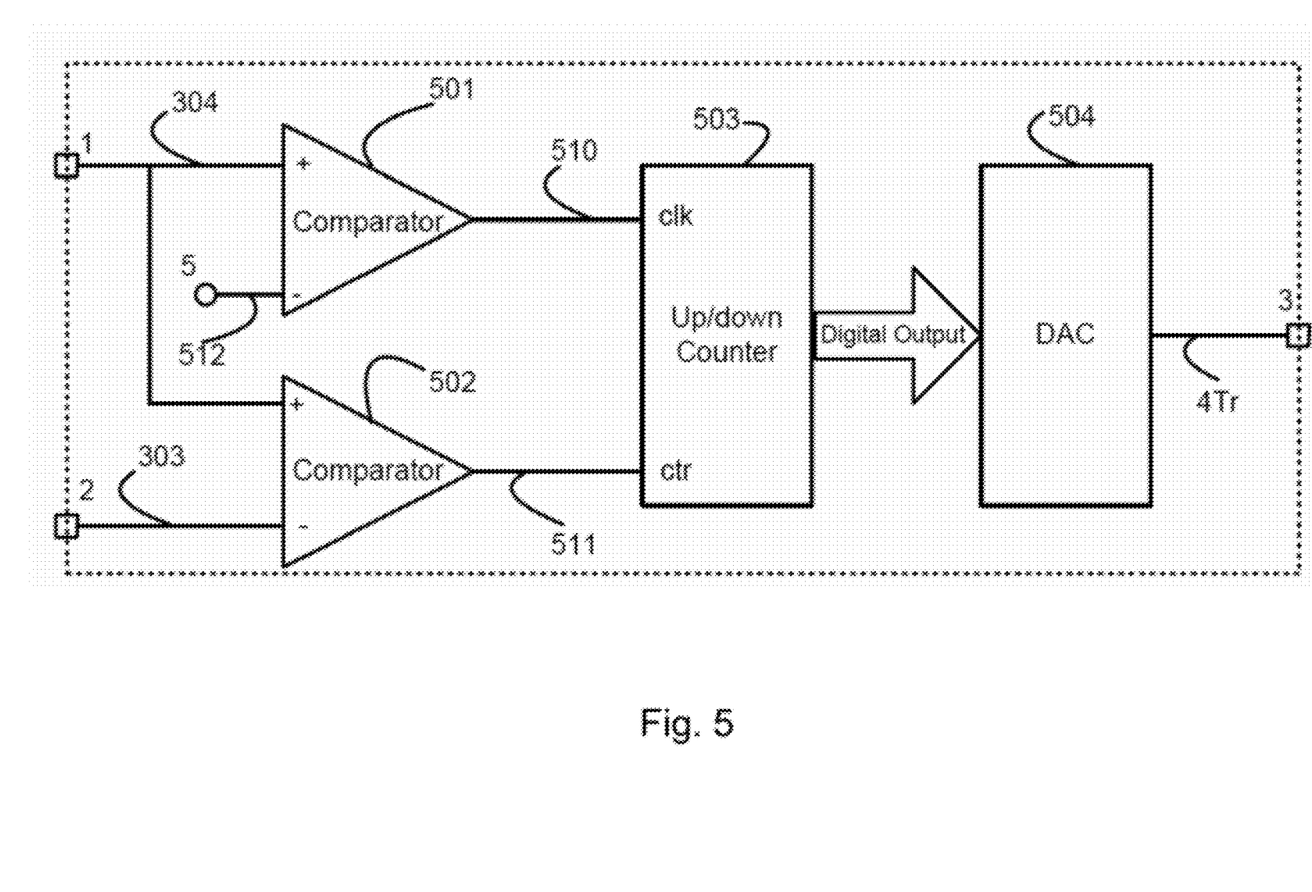
FIG. 5 represents a functional block diagram of the THD Reducer according to the present invention.
Figure 6:
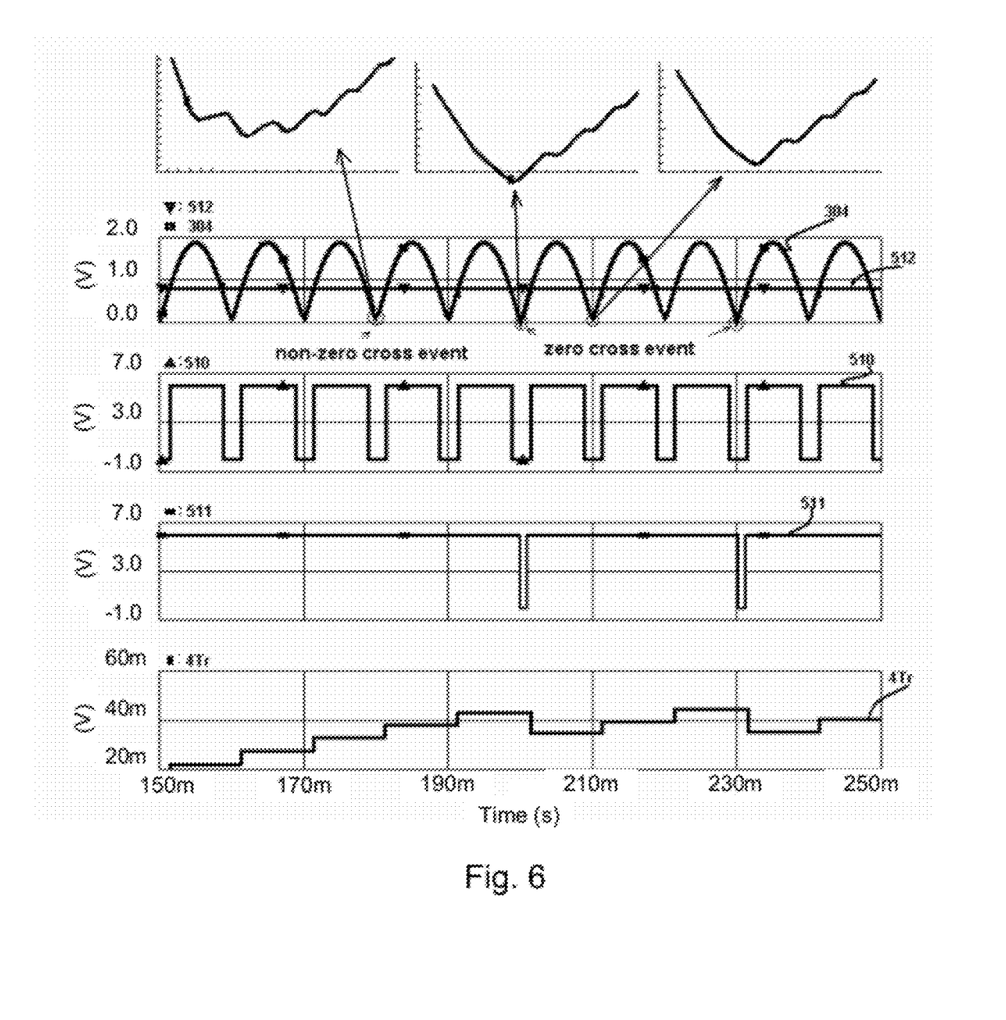
FIG. 6 shows the operation waveforms of the THD Reducer

THD Reducer 407 (FIG. 4) is the key component to enable the system depicted in FIG. 3 automatically searching for optimum offset voltage 4Tr for THD optimization in spite of the AC line voltage, output loading and parasitic capacitor value at node 306. The functional block diagram and operational principle of THD Reducer 407 (FIG. 4) is illustrated in FIG. 5 and FIG. 6 respectively. THD Reducer comprises two comparators 501 & 502, one Up-down Counter 503 and Digital to Analog Converter 504. THD Reducer 407 (FIG. 4) receives scaled down rectified AC line voltage from node 304 (FIG. 3) that is simultaneous coupled to the non-inverting input of comparator 501 & 502 (FIG. 5) respectively. Comparator 501 is used to extract rectified AC line frequency, for example 100 Hz, to produce a clock signal for Up-down Counter 503 (FIG. 5). When signal 304 coupled to the non-inverting input of Comparator 501 (FIG. 5) descends down to the clock reference signal 512 coupled to inverting input of Comparator 501 (FIG. 5), a falling edge clock signal is produced from Comparator 501 (FIG. 5). Vice versa, a rising edge clock signal is created. The waveforms of signal 304, clock reference signal 512 and Clock signal 510 related to Comparator 501 (FIG. 5) are shown in FIG. 6. Comparator 502 is used to detect the zero crossing of Rectified divided down line voltage signal 304 relative to local ground signal 303 (FIG. 3). Whenever a zero crossing event is detected, a logic low pulse signal generated from Comparator 502 is recorded in Up-down Counter 503 (FIG. 5). Up-down Counter 503 (FIG. 5) is responsible for recording the number of difference between non-zero crossing and zero crossing events with running time elapse. Each clocking cycle, the numerical digital output value of Up-down Counter is decremented by one if zero crossing events is detected or incremented by one if not. DAC 504 (FIG. 6) converts the numerical digital value from Up-down counter is to an analog DC voltage which is presented to node 4Tr (FIG. 4). Summation of 4Tr (FIG. 4) and signal 4Mo (FIG. 4) generated from Multiplier 402 (FIG. 4) produces a sinusoidal current reference signal for Comparator 403 (FIG. 4) which is used to set the off period of Power switch 3NMOS such that the residual voltage across the capacitor 3C1 after the bridge rectifier (FIG. 3) is eliminated.

Figure 7A:
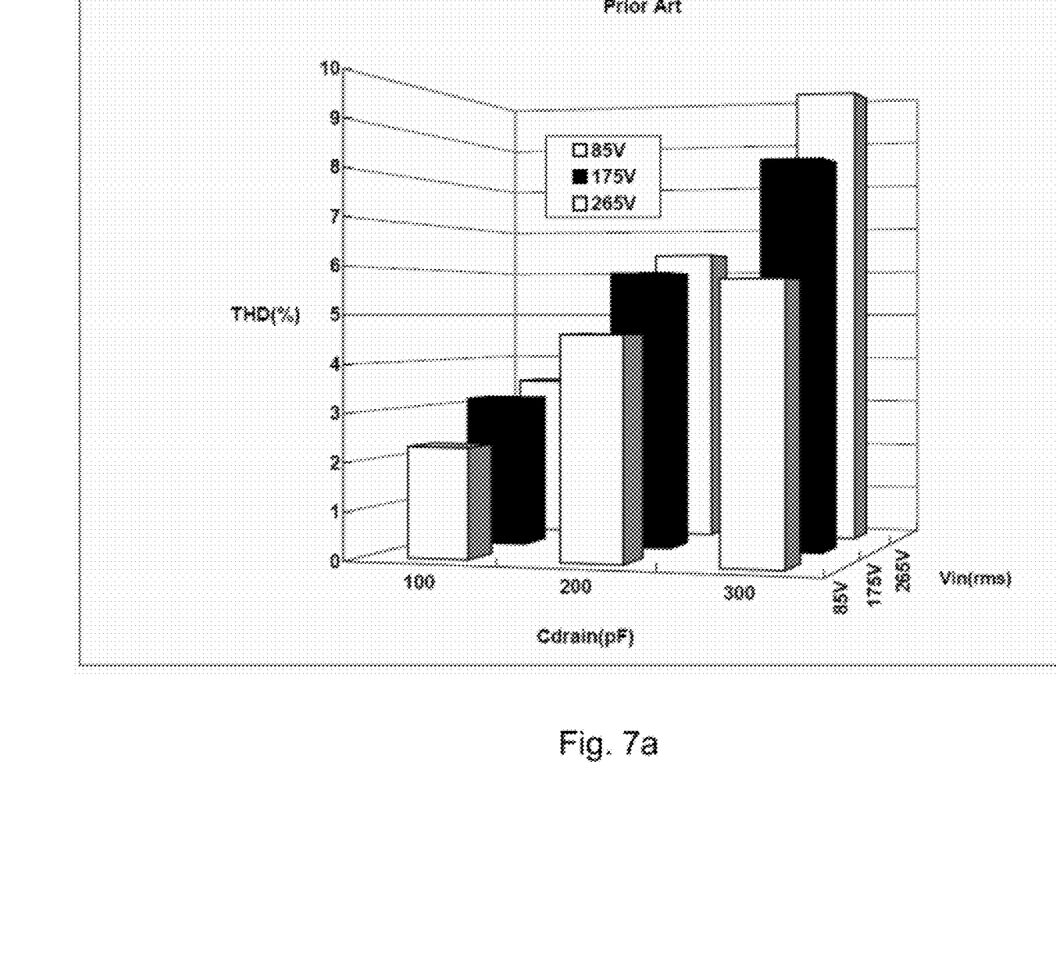
FIGS. 7a and 7b show the THD value for the prior-art PFC of FIG. 1 and the present invention PFC of FIG. 3 with differing input voltage Vin and equivalent parasitic capacitance at node 306C drain respectively.
Figure 7B:
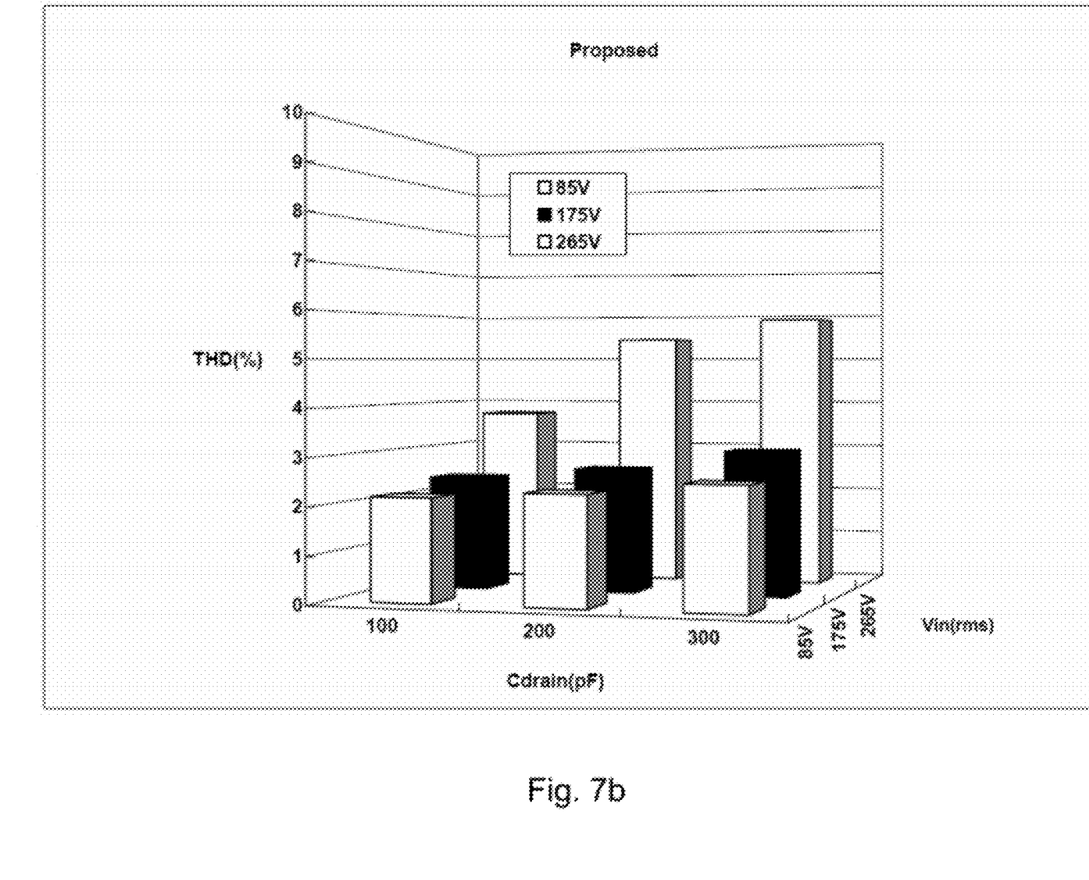

FIGS. 7a and 7b show the THD value for the prior-art PFC of FIG. 1 and the present invention PFC of FIG. 3 with differing input voltage and Cdrain capacitance. For the circuit depicted in FIG. 1, it's optimized at input voltage=85 Vac and Cdrain=100 pF. While for the circuit FIG. 3, the system automatically finds its optimum point without any manual adjustment. Significant improvement can be observed especially as Cdrain varies.

The foregoing description is just the preferred embodiment of the invention. It is not intended to exhaustive or to limit the invention. Any modifications, variations, and amelioration without departing from the spirit and scope of the present invention should be included in the scope of the prevent invention. And the present invention also may be integrated into an AC-to-DC converter, or a power supply and other situation allowable.

The invention claimed is:

1. A transition mode power factor correction device, comprising a converter and a controller coupled to the converter to obtain an input voltage, wherein the controller comprises a total harmonic distortion (THD) reducer capable of achieving an automatic THD optimization, wherein the converter comprises:
a bridge rectifier connected to an alternating current (AC) line voltage to have a rectified sinusoidal line voltage;
a rectified main voltage divider connected to the bridge rectifier to scale down the rectified sinusoidal line voltage such that a scale-down rectified sinusoidal line voltage can be used by the controller;
a capacitor connected with the rectified main voltage divider in series to filter high frequency components of the rectified sinusoidal line voltage;
a power switch;
a boost inductor with auxiliary winding; and
an outputting circuit with an output diode and an output voltage divider,
wherein the power switch, the boost inductor, the rectified main voltage divider and the controller form a THD optimization feedback loop;
wherein the power switch, the outputting circuit and the controller form a feedback control loop to maintain an constant output voltage level; and
wherein an anode of the output diode is connected to a drain of the power switch, a cathode of the output diode is connected to the output voltage divider, and the constant output voltage level is output at the cathode of the output diode; and the controller comprises:
a THD reducer for setting an appropriate offset voltage to force the valley of the scale-down rectified sinusoidal line voltage close to a reference value through the feedback control;
an error amplifier for generating an output voltage error signal corresponding to a deviation between a scale-down output voltage from the output voltage divider and a predetermined reference voltage;
a multiplier for combining the scale-down rectified sinusoidal line voltage with the output voltage error signal to generate a sinusoidal reference signal;
a comparator for generating a logic signal for setting the power switch on period by comparing a received current sense signal with the sinusoidal reference signal;
a zero crossing detector for generating an edge logic signal to turn on the power switch; and
a RS flip-flop register and a gate driver combined to create a required analog waveform pattern for driving the power switch and thereby approximating the shape of the current running through the boost inductor to the sinusoidal waveform of the rectified sinusoidal line voltage and in the meantime to keep the valley of the scale-down rectified sinusoidal line voltage close to a reference value.

2. The transition mode power factor correction device according to claim 1, wherein the THD reducer comprises two comparators, an up-down counter and a digital to analog converter (DAC), wherein
a first comparator is used to extract a rectified AC line frequency to produce a clock signal for the up-down counter;
a second comparator is used to detect a zero crossing of the scale-down rectified sinusoidal line voltage relative to a reference value;
the up-down counter is used to record a number of difference between non-zero crossing and zero crossing events with running time elapse; and
the DAC is used to convert the numerical digital value from the up-down counter to an analog direct current (DC) voltage.

3. The transition mode power factor correction device according to claim 2, wherein, a signal coupled to non-inverting input of the first comparator descends down to a clock reference signal coupled to inverting input of the first comparator, a falling edge clock signal is produced from the first comparator.

4. The transition mode power factor correction device according to claim 2, wherein, a signal coupled to non-inverting input of the first comparator rises up to the clock reference signal coupled to inverting input of the first comparator, a raising edge clock signal is produced from the first comparator.

5. A controller used in a transition mode power factor correction device and suitable for achieving an automatic total harmonic distortion (THD) optimization, comprising:
a THD reducer for setting an appropriate offset voltage to force the valley of a scale-down rectified sinusoidal line voltage close to a reference value through a feedback control;
an error amplifier for generating an output voltage error signal corresponding to a deviation between a scale-down output voltage and a predetermined reference voltage;
a multiplier for combining the scale-down rectified sinusoidal line voltage with the output voltage error signal to generate a sinusoidal reference signal;
a comparator for generating a logic signal for setting a power switch on period by comparing a received current sense signal with the sinusoidal reference signal;
a zero crossing detector for generating an edge logic signal to turn on the power switch; and
a RS flip-flop register and a gate driver combined to create a required analog waveform pattern for driving the power switch and thereby approximating the shape of the current running through to the sinusoidal waveform of the rectified sinusoidal line voltage and in the meantime to keep the valley of the scale-down rectified sinusoidal line voltage close to a reference value.

6. The controller according to claim 5, wherein the THD reducers two comparators, an up-down counter and a digital to analog converter (DAC), wherein
a first comparator is used to extract a rectified alternating current (AC) line frequency to produce a clock signal for the up-down counter;
a second comparator is used to detect a zero crossing of the scale-down rectified sinusoidal line voltage relative to the reference value;
the up-down counter is used to record a number of difference between non-zero crossing and zero crossing events with running time elapse; and
the DAC is used to convert the numerical digital value from the up-down counter to an analog direct current (DC) voltage.

7. The controller according to claim 6, wherein a signal coupled to non-inverting input of the first comparator descends down to a clock reference signal coupled to inverting input of the first comparator, a falling edge clock signal is produced from the first comparator.

8. The controller according to claim 6, wherein a signal coupled to non-inverting input of the first comparator rises up to a clock reference signal coupled to inverting input of the first comparator, a raising edge clock signal is produced from the first comparator.

9. A total harmonic distortion (THD) reducer for setting an appropriate offset voltage to force the valley of a scale-down rectified sinusoidal line voltage close to a reference value through a feedback control, wherein the THD reducer comprises two comparators, an up-down counter and a digital to analog converter (DAC), wherein
a first comparator is used to extract a rectified alternating current (AC) line frequency to produce a clock signal for the up-down counter;
a second comparator is used to detect a zero crossing of the scale-down rectified sinusoidal line voltage relative to the reference value;
the up-down counter is used to record a number of difference between non-zero crossing and zero crossing events with running time elapse; and
the DAC is used to convert the numerical digital value from the up-down counter to an analog direct current (DC) voltage.

10. The THD reducer according to claim 9, wherein a signal coupled to non-inverting input of the first comparator descends down to a clock reference signal coupled to inverting input of the first comparator, a falling edge clock signal is produced from the first comparator.

11. The THD reducer according to claim 9, wherein a signal coupled to non-inverting input of the first comparator rises up to a clock reference signal coupled to inverting input of the first comparator, a raising edge clock signal is produced from the first comparator.

* * * * *